United States Patent [19]

Krishen et al.

[11] Patent Number: 5,005,147
[45] Date of Patent: Apr. 2, 1991

[54] METHOD AND APPARATUS FOR SENSOR FUSION

[75] Inventors: Kumar Krishen, Seabrook, Tex.; Scott W. Shaw, Saratoga, Calif.; Rui J. P. deFigueiredo, Houston, Tex.

[73] Assignee: The United States of America as represented by the Administrator, the National Aeronautics and Space Administration, Washington, D.C.

[21] Appl. No.: 292,130

[22] Filed: Dec. 30, 1988

[51] Int. Cl.$^5$ .............................................. G06F 15/20
[52] U.S. Cl. .................................................... 364/578
[58] Field of Search ............... 364/578, 513, 900, 516, 364/559, 560, 561, 564, 413.25, 413.19; 382/41, 49, 65; 358/96, 105, 107; 901/47

[56] References Cited

U.S. PATENT DOCUMENTS

| | | | |
|---|---|---|---|
| 3,076,961 | 2/1963 | Bibbero | 343/6 |
| 3,981,010 | 9/1976 | Michelsen | 343/6 |
| 4,443,855 | 4/1984 | Bishop et al. | 364/513 |
| 4,488,173 | 12/1984 | Di Matteo et al. | 364/559 |
| 4,550,432 | 10/1985 | Andersson | 382/1 |
| 4,611,292 | 9/1986 | Ninomiya et al. | 364/559 |
| 4,620,285 | 10/1986 | Perdue | 364/513 |
| 4,672,562 | 6/1987 | Egli et al. | 364/559 |
| 4,672,564 | 6/1987 | Egli et al. | 364/559 |
| 4,802,759 | 2/1989 | Matsumoto et al. | 364/560 |
| 4,839,824 | 6/1989 | Ando | 364/516 |
| 4,849,906 | 7/1989 | Chodos et al. | 364/516 |
| 4,855,932 | 8/1989 | Cangiani et al. | 364/516 |
| 4,858,157 | 8/1989 | Murai et al. | 364/560 |
| 4,864,515 | 9/1989 | Deck | 364/516 |
| 4,866,362 | 9/1989 | Parker et al. | 364/513 |
| 4,873,651 | 10/1989 | Raviv | 364/559 |

OTHER PUBLICATIONS

"Sensor Data Fusion Through a Distributed Blackboard", 1986, S. Y. Harman, G. L. Bianchini & B. F. Pinz. Int. Conf. on Robotics & Automation, pp. 1449–1454.
"Sensor Fusion & Object Localization", 1986, S. Shekhar, O. Khatib & M. Shimojo, Int. Conf. on Robotics & Automation, pp. 1623–1628.
"The Issues & Approaches of a Robot Multi-Sensor Integration", 1987, Ren C. Luo, Min-Hsuing Lin & Ralph S. Scherp, IEEE Int. Conf. on Robotics & Automation, pp. 1941–1946.
"Consistent Integtration & Propagation of Disparate Sensor Observations", 1986, Hugh F. Durrant-Whyte, Proc. IEEE Int. Conf. on Robotics & Automation, pp. 1464–1469.
"Building Representations from Fusions of Multiple Views", E. W. Kent, M. O. Shuier & T. H. Huang, Proc. IEEE Int. Conf. on Robotics & Automation, pp. 1634–1639.
"Sensor Data Fusion on a Parallel-Processor", 1986, S. L. Chiu, D. J. Morley & J. F. Martin, Int. Conf. on Robotics & Automation, pp. 1629–1633.

(List continued on next page.)

Primary Examiner—Parshotam S. Lall
Assistant Examiner—Ellis B. Ramirez
Attorney, Agent, or Firm—Hardie R. Barr; Harold W. Adams; Edward K. Fein

[57] ABSTRACT

Methods and apparatus for fusion of data from optical and radar sensors by error minimization procedure. The method has been applied to the problem of shape reconstruction of an unknown surface at a distance. The method involves deriving an incomplete surface model from an optical sensor. The unknown characteristics of the surface are represented by some parameter. The correct value of the parameter is computed by iteratively generating theoretical predictions of the Radar cross-sections (RCS) of the surface, comparing the predicted and the observed values for the RCS, and improving the surface model from results of the comparison. Theoretical RCS may be computed from the surface model in several ways. One RCS prediction technique is the method of moments. The method of moments can be applied to an unknown surface only if some shape information is available from an independent source. The optical image provides the independent information.

20 Claims, 5 Drawing Sheets

OTHER PUBLICATIONS

"Two Sensor Are Better than One: Example of Integration of Vision and Touch", 1985, P. Allen & R. Bajcsy, Proc. Third Int. Symposium on Robotics Research, Giralt, Eds., MIT Press: Cambridge, Mass.

"Model Based Recognition & Localization from Sparse Range & Tactile Data", Fall 1984, W. E. L. Grimson & T. Lozano-Perez, Int. Jrnl. of Robotics Research, vol. 3, No. 3.

"Search & Sensing Strategies for Recognition & Localization of Two- and Three-Dimensional Objects", 1986, W. Eric L. Grimson and Tomas Lozano-Perez, Third Int. Symp. on Robotics Research, pp. 73 & 80, MIT Press, Cambridge, Mass.

"Representation & Maintenance of a Composite Model", 1986, J. L. Crowley, Int. Conf. on Robotics & Automation, pp. 1455-1462.

"On Modelling 3D Objects Using Multiple Sensory Data", 1987, Y. F. Wang & J. K. Aggarwal. Proc. IEEE Int. Conf. on Robotics & Automation, Raleigh, N.C., pp. 1098-1103.

"Microwave & Optical Sensor Fusion for Shape Extraction of 3D Space Objects", Apr. 1988, Scott W. Shaw, Doctoral Thesis, Rice University, Houston, Texas.

"Radar Cross Sections of a Rectangular Flat Plate as a Function of Aspect Angle", May 1966, R. A. Ross, IEEE Transactions on Antennas and Propagation, vol. AP-14, No. 3, pp. 329-335.

"Radar Cross-Section Handbook", 1970, G. T. Ruck, D. E. Barrick, W. D. Stuart, C. K. Kirchbaum, vol. 1, Plenum Press, New York.

"A Monostatic Inverse Scattering Model Based on Polarized Utilization", 1976, S. J. Choudhuri & W. M. Boerner, Appl. Phys., vol. 11, pp. 337-350.

"Field Computation by Moment Methods", 1968, R. F. Harrington, The Macmillan Company, New York.

"Microwave & Video Sensor Fusion for the Shape Extraction of 3D Space Objects", 1987, Scott W. Shaw, Kumar Krishen, Rui J. P. deFigueiredo, SPIE-The International Society for Optical Engineering, Cambridge, Mass., Space Station Automation III, vol. 851, pp. 69-74.

"Robotic Vision/Sensing for Space Applications", 1987, Kumar Krishen, Rui J. P. deFigueiredo & Olin Graham, IEEE International Conference on Robotics & Automation, Raleigh, N.C., vol. 1, pp. 138-150.

METHOD AND APPARATUS FOR SENSOR FUSION

ORIGIN OF THE INVENTION

The invention described herein was made by an employee of the United States Government, and others, and may be manufactured and used by and for the Government of the United States of America for governmental purposes without payment of any royalties thereon or therefor.

BACKGROUND OF THE INVENTION

1. Field of the invention

The present invention relates to image enhancement methods and more particularly to image enhancement methods using the fusion of data from optical and microwave sensors.

2. Description of the Related Art

Related inventions include the following U.S. Pat. Nos. 4,672,562 and 4,672,564 to Egli, et al, which disclose photodetector arrays and include computational means for determining spatial information about target objects; U.S. Pat. No. 4,620,285 to Perdue which teaches a combined sonar ranging and light detection; U.S. Pat. No. 3,981,010 to Michelsen which shows a system for locating objects and includes a radar system in combination with a television camera having the outputs combined in a data processing system to determine direction and range to the objects; U.S. Pat. No. 4,611,292 to Ninomiya, et al, which discloses a robot vision system including twin light beams used to determine the coordinates of an object; U.S. Pat. No. 4,550,432 to Anderson which teaches an image processor using a moment generator including processor means for determining the moments of a geometrical object; U.S. Pat. No. 4,443,855 to Bishop, et al, which reveals a sensing and control system using a mask algorithm image processor to generate control or command signals. None of the discovered related art teaches use of a first sensor in predicting the output of a second sensor and use of non-linear minimization techniques in determining the shape of objects.

Sensor Fusion (SF) techniques have been developed to combine information from such diverse sources as optical imagery, laser ranging, structured light, and tactile feedback. The present invention relates to the fusion of a set of polarized RCS measurements with optical imagery. The polarized RCS yields detailed information about an object's surface only if some other independent surface information is available. An interpreter needs information from an alternate source such as an optical image to convert the RCS into spatial information that a general SF system can use. Once this conversion is completed, the more traditional concepts of SF may be employed. A brief examination of the state-of-the-art in SF is provided, along with comparisons between the state-of-the-art and our SF method.

Sensor Fusion Generally

The purpose of SF is to combine the interpreted outputs of various sensors into a consistent world-view that is in some way better than its component interpretations, for example, the sense of confidence in an interpretation may be greater, or the resulting composite surface or workspace may be more complete than for a single sensor, or a combination of both. Although all SF systems produce some kind of spatial, or geographic information, they may be divided into two groups. The first type of fusion system sees the world as a collection of discrete objects and tries to localize these objects. The second type attempts to describe the details of continuously connected surfaces. The common thread is the attempt to deal with uncertain, conflicting, and incomplete data. Most SF systems attempt to sift through a collection of tokens representing spatial primitives and, when possible, merge two or more tokens into one. Examples of the tokens used are frames describing objects and individual surface patch contour descriptions.

Various techniques have been developed to perform the fusing of information from different sensors that describe the same object. Harmon, et al, (S. Y. Harmon, G. L. Bianchini, and B. E. Pinz, "Sensor Data Fusion Through a Distributed Blackboard," Int. conf. on Robotics and Automation, pp.1449–1454, 1986) divides the approaches into three categories: "averaging", "deciding", and "guiding". In "averaging" techniques, confidence measures are used to weight various estimates of the same property to compute an average value that may not be exactly equivalent to any individual estimate. When "deciding", one particular estimate is picked from many others to represent the entire data set. Again, this choice is based on confidence measures. The third technique, "guiding", uses one estimate to direct the acquisition of further estimates.

The present invention is SF method employing primarily a "guiding" shape extraction technique. The partial surface model acquired from optical image data guides the conversion of RCS data into a complete surface model.

Object Localization Techniques

Researchers have investigated a variety of statistical methods for integrating uncertain and redundant geometric information about discrete objects. These methods include weighted estimates, confidence measures and Bayesian estimation. Other researchers have concentrated on the overall architecture of the resulting information-processing system. Both aspects of the problem must be addressed in order for an efficient knowledge and information handling mechanism to use the most accurate statistical model.

Statistical Models

Shekhar, et al, (S. Shekhar, O. Khatib, and M. Shimojo, "Sensor Fusion and Object Localization", Int. conf. on Robotics and Automation, pp. 1623–1628, 1986) have developed a system for determining the six degrees of freedom of an object by combining multiple estimates. The sensory data considered was from tactile sensors placed on the robot end-effector. Errors in the positioning of the manipulator lead to uncertain estimates of attitude and position. These measurement errors are assumed to be known a priori and are used to weight final estimates. Orientation and position estimates are carried out independently. Position estimates are computed by a simple weighted average. Orientation estimates are derived by representing the rotation matrix as a quaternion and solving the resulting linear system of equations by a weighted left inverse. This method assumes much information is provided to the system. This information includes complete stored object descriptions and correspondence between sensed points and model points. This technique is clearly of the "averaging" variety. A complete sensor fusion system is described by Luo, et al. (Ren C. Luo, Min-Hsiung Lin, and Ralph S. Scherp, "The Issues and Approaches of a Robot Multi-Sensor Integration," Proc. IEEE Int. conf. on Robotics and Automation, pp. 1941-1946, Raleigh, N. C., 1987). The decision process and the statistical models are considered together. A group of sensor observations is first selected based on the task at hand. Observations of the same physical property are fused by a two-step process. The first step selects observations to be fused, and the second step combines them into one estimate. Each observation is characterized by a normal power distribution function (p.d.f.), and a distance is defined between p.d.f.'s. These distances ar then thresholded and the largest connected group of observations is chosen to be fused. The optimal estimate is then derived by maximizing the sum of conditional probabilities for the estimate weighted by the probability of each observation. Finally, an attempt is made to compensate those observations discarded in the first step of the process. This technique constitutes a hybrid between "deciding" and "averaging".

A complex method for integrating disparate sensor observations is presented by Durrant-Whyte (Hugh F. Durrant-Whyte, "Consistent Integration and Propagation of Disparate Sensor Observations," Proc. IEEE Int. conf. on Robotics and Automation, pp. 1464-1469, 1986). Uncertain measurements are combined in such a way that geometric consistency is maintained in the world-model. To insure robustness, the p.d.f.'s of each sensor observation are characterized as the sum of two normal distributions, of which, only one covariance is known. Observations that fall outside an ellipse enclosing the mean of the known distribution are discarded. The remaining samples are considered jointly normal with known covariance. A Bayesian estimate of the sensor value is found by minimizing a loss function under geometric constraints. Durrant-Whyte emphasizes that he is not solving a recognition problem. The SF system deals only with abstract geometric information. This system is also a combination of "averaging" and "deciding".

Computing Architectures

Various architectures have been proposed for handling multiple sensory information. Harmon, et. al. describe a system based on a distributed blackboard. Each sensor subsystem has its own copy of the up-to-date world model, made up of tokens, each of which represents an object, a selected object property and its value, along with an error range, a confidence factor and a time stamp. Communication between subsystems is accomplished through a local area network. Subsystems share only high-level, abstract information, leaving the recognition task to the individual sensors.

A system using two types of knowledge representation is described by Kent, et. al (E. W. Kent, M. O. Shuier, and T. H. Huang, "Building Representations from Fusions of Multiple Views," Proc. IEEE Int. conf. on Robotics and Automation, pp. 1634-1639, 1986). The purpose of this system is to fuse multiple views of the same workspace taken over time. A world model is built up and compared to internally stored information. The system is also capable of handling objects that have no stored model. Spatial information about the workspace is represented by an octree. Knowledge about discrete objects and their features is maintained separately in a list. The system operates by generating predictions about the world and then matching these predictions with the observed data. The system deals with dynamic information in real time, and is updated continuously.

Chiu, et. al. claim that sensor fusion should be represented hierarchically as a data-flow process (S. L. Chiu, D. J. Morley, and J. F. Martin, "Sensor Data Fusion on a Parallel-Processor," Int. conf. on Robotics and Automation, pp. 1629-1633, 1986). They propose that this process be implemented on a parallel processor.

Surface Reconstruction Techniques

The RCS-Optical system of present invention falls into the category of SF techniques intended to reconstruct continuous surfaces rather than collections of discrete objects. Previous work in this area has been done by Allen and Bajcsy, Grimson, Crowley, and Wang and Aggarwal.

Allen and Bajcsy (P. Allen and R. Bajcsy, "Two Sensor Are Better than One: Example of Integration of Vision and Touch," in Proc. Third Int. Symposium on Robotics Research, Giralt, Eds., MIT Press: Cambridge, Mass., 1985) demonstrated that the combination of multiple sensors can produce a 3D object description that is better than those derived from individual sensors. They have used the paradigm of computational stereo to build occluding contour descriptions that contain gaps and inaccuracies. The interior of the surface and the uncertain points on the contours are filled in with an active tactile sensor. Coons patches (composite bicubic surfaces) are used to interpolate between critical points. The resulting object description is a $2\frac{1}{2}$ D sketch of the unknown object. This is a good example of a "guiding" technique, since the optical information controls the movement of the tactile sensor.

By restricting unknown objects to those composed of polyhedral faces, Grimson, et al (W. E. L. Grimson, and T. Lozano-Perez, "Model Based Recognition and Localization from Sparse Range and Tactile Data," Int. Jrnl. of Robotics Research, Vol. 3, no.3, Fall, 1984) were able to generate some constraints that allowed sparse isolated surface points and normal estimates to be matched with stored models. The surface data could, in principle, be derived from any source, the specific cases being range and tactile observations. Using heuristics derived from the geometry of polyhedral objects, such as maximum and minimum distances between pairs of points on different facets, consistent normal angles, amounts of rotation, etc., the investigators were able to prune the search tree of point-facet pairings. With the pruning done beforehand, most point labelings need not be considered when determining a proper model match. Grimson found that even a poor estimate of surface normals greatly simplifies the attitude determination problem. In a later publication, they expand their method to include recognition of partially occluded objects (W. Eric L. Grimson and Tomas Lozano-Perez, "Search and Sensing Strategies for Recognition and Localization of Two- and Three-Dimensional Objects," Third Int. Symp. on Robotics Research, pp. 73, 80, MIT Press, Cambridge, Mass., 1986). Also, the efficiency of the algorithm was improved by estimating possible configurations by Hough transforms.

Crowley (J. L. Crowley, "Representation and Maintenance of a Composite Surface Model," Int. conf. on Robotics and Automation, pp. 1455-1462, 1986) saw the need, when combining information from different sources, for a standard knowledge representation. He used primitives representing planar surface elements and contours joining elements. Each attribute of a primitive is represented as an uncertainty range in which the exact number is believed to lie. The result is surface elements and contours that are not two- and one-dimensional manifolds in three-space, but represent some volume where such manifolds may exist. Both stored knowledge and acquired data may be represented in the same form. A model that is being constructed need not be complete, or represent any physically realistic surface. A surface patch need not have bounding contours on each side, and a contour does not need to point to two surface patches. These missing facts may be inferred, however, in the fusion process, and incomplete models matched to stored library models. The form of each piece of data remains intact as the surface model is constructed and primitives are added and merged. Each primitive has a confidence factor associated with it, and elements are combined or removed based on this confidence factor. This SF technique is of the "deciding" variety.

Wang and Aggarwal also dealt with modeling 3D surfaces using diverse sources of information (Y. F. Wang and J. K. Aggarwal, "On Modelling 3D Objects Using Multiple Sensory Data," Proc. IEEE Int. conf. on Robotics and Automation,: pp. 1098–1103, Raleigh, N. C., 1987). Their technique is similar to ours in that they used one source of information to determine occluding contours, and another source to fill interiors of 3D objects. The occluding contours are derived from a thresholded optical image, and partial surface structures are inferred from structured light. Multiple views of an object are considered. The partial surface structures are allowed to move along an axis defined by the occluding contours observed at the same time. The actual position of any one surface along its axis is determined by matching it with the cylindrical volume derived from occluding contours in another view. Pairs of surfaces and bounding volumes that are most nearly orthogonal to each other are combined. This allows one surface structure to be positioned to the greatest accuracy without relating to other surface structures.

Wang and Aggarwal mention that efficient data structures such as octrees are used to store the surface data, but the issue of uniform data representation was not directly addressed in their paper. It is possible that an octree structure may have to be altered as new surface data is incorporated at different levels of resolution. This may result in some wasted time in a general SF system. Most SF systems use lists of tokens of equal significance that may be linked bidirectionally in various ways as opposed to an hierarchical data structure such as an octree. As new information is added in this type of system, relationships may be noted without disturbing the links that have already been established. The final smooth surface representation is derived by spline approximation. Therefore, the spline basis functions and their knots may be thought of as the surface knowledge representation primitives. If conflicting surface points arise, their weighted average is computed. Thus, this SF technique falls into the "averaging" category. It might also be classified as a "guiding" technique, since the occluding contours from one view are used to guide the placement of partial surface structures in another.

RCS/Image Surface Reconstruction

Examining these previous attempts at sensor fusion, we are able to make comparisons and draw suggestions from the work that has gone before. Even though our system uses a new combination of information, there remain strong similarities with other techniques. In addition there are shared pitfalls. Although our microwave and video SF system may at first appear to be a simple "guiding" technique, the problem of how to handle conflicting and uncertain information had to be addressed. If a partial surface may be reconstructed from the RCS, how can it be resolved with the optical image surface? Are there points of contradiction? Which interpretation should be given more weight, and how are such weights assigned? Also, what is the most efficient and uniform data structure for storing, inferring, and reconstructing surface-knowledge derived from the optical image, RCS, and library models?

In one particular application of our SF technique, interior surface patches are reconstructed from the RCS by an iterative minimum error technique. This surface patch covers a portion of the surface whose optical image has been degraded in some fashion. The surface patches to be reconstructed have some predetermined finite support, such as a rectangle, in the parameter domain. It is unlikely that the degraded portion of the image will have this exact shape, so the smallest support of predetermined shape that completely covers the degraded portion must be used. This results in overlapping areas between the optically derived surface and the RCS reconstructed surface. Although the two surfaces may agree at the initial estimate, the minimization procedure could easily produce a surface patch that does not match the optical surface exactly at its edges. Since both surfaces are uncertain to some degree, some convention must be adopted to resolve these conflicts. If the surface is represented by a continuous manifold, an "averaging" technique must be used to preserve continuity. If, however, the surfaces are represented by a collection of discrete points, a decision process may be applied to choose an appropriate z value at a given location. The "averaging" step that preserves continuity could then be taken care of by spline interpolation. The weight or confidence assigned to each point depends on a variety of possible sources of error. For the optically derived surface, uncertainties may arise from errors in camera positioning, light source location, noise, model inaccuracy, and image registration. For the RCS surface, factors such as detection error, ambient reflections, and range uncertainty can contribute to RCS measurement error, and inappropriate modeling assumptions, numerical inaccuracies, and insufficient grid density can produce error in the conversion from RCS to surface.

In simulations of this method, discrete surface point samples were used as a means for representing 3D geometric knowledge. This type of representation lends itself well to microwave scattering computations. In addition to a location in three-space, each surface point should carry with it an estimate of surface normal at that point. If no surface normal estimate is available, a coarse one may be inferred from the surrounding points. A token that represents a surface point must also carry a confidence factor appropriate to the decision process to be used. Also, a range of possible values may be specified for each numerical attribute in the manner adopted by Crowley. This additional information is necessary in order to resolve inconsistencies between the optical surface and the final surface derived through the error minimization process.

Utility of Sensor Fusion

One example of the utility of incorporating the microwave RCS into a space robot's sensory information is attempting to overcome some of the difficulties associated with optical imaging in space.

A sensor system for a space robot must be able to gather and interpret information about the spatial location of discrete objects in a scene, their shape and motion. This information must be complete and accurate enough to allow the robot to navigate within its workspace, and manipulate selected objects. Clearly, the demands on a space robot sensor system are dictated by the type of scene that it expects to encounter. Furthermore, the scene type is dictated by the task that the robot must perform.

The shape extraction system makes use of the assumption that targets consist of isolated, smooth shapes constructed of some perfectly conducting material. In reality, more than one target may be present, and the shape of these targets may be complex. Certain questions must be answered about the scene to be viewed, and the objects that make up these scenes. For example, their expected complexity, range, and motion must be determined.

The attributes of the individual objects that comprise the scene are also of interest. Target properties that affect the accuracy of the scattering model are shape, surface roughness, dielectric constant, and motion. Objects may in turn be decomposed into components that have well-defined properties.

Typical scenes which an automated sensor system might encounter in space vary widely. They may be simple, or complex in terms of numbers of objects, and they may be in motion with respect to several degrees of freedom. In general, the scene characteristics depend on the task at hand. The characteristics that must be determined for each task are complexity, range, and motion.

Jobs that could be automated in space usually fall into the three broad categories of tracking, retrieval, and servicing. Each of these tasks involve different types of scenes which a robot's sensing system must deal with. Over the life of a given robot mission all three tasks could be encountered, but a single vision system should only have to interpret one type of scene at a time. Consider an automated satellite maintenance mission. Such a task requires that the robot first track the target from a distance, then approach the target at close range, and finally dock and execute the necessary servicing operations.

An important aspect of the shape reconstruction method of instant invention is the use of optical sensing to derive a first approximation to the target shape. A computer vision system that is able to even partially determine the shape of three-dimensional objects will consist of many independent sub-systems. Each of these subsystems may be the result of years of research and testing, so the literature on this subject is vast.

Computer vision system components usually fall into two categories: those that deal with low-level processes, and those that perform high-level functions. Low-level vision includes image acquisition, digitalization, and simple linear filtering. High-level vision involves the more complex tasks of matching and shape determination.

Low-Level Vision Subsystems

Image acquisition is the first step in the optical imaging sequence. In this step, the light that comprises the image enters the camera through a series of lenses, and is focused onto a sensing element. The sensing element converts the light into an electrical signal. Important characteristics of this stage in the image formation process are the aspect ratio of the camera, the focal length and diameter of the optical lenses, and the type and characteristics of the light sensor.

The analog video image must then be converted into digital form so that the optical information may be manipulated by computer. This process, known as digitalization, also affects the usefulness of the final image product. Parameters such as the size, number, and spatial distribution of the pixels influence the amount of information from the analog image which survives into the digital image.

Low-level vision also includes some simple filtering techniques. These traditional image processing routines are important to the resulting shape interpretation and must be given careful consideration. The two low-level processing steps that are relevant to the present invention are thresholding and edge detection. A vision system must be able to separate objects from background to approximate their shape for the initial parameter determination. This is most easily accomplished through thresholding, where a bright object is assigned one brightness value, and the dark background another. In some instances, the numerical shape reconstruction system depends heavily on knowledge of the scattering target's occluding contours. To determine an object's occluding contours, edge detection is required.

High-Level Vision Subsystems

High-level vision subsystems are those that not only process the optical image, but attempt to extract some information regarding the location, shape, motion, etc. of the objects in the image. There are two approaches to this problem. The first approach is to compare the optical image to a library of stored images, or images generated from a library of stored object models. The second approach is to generate a three-dimensional shape directly from the information in the optical image. The matching approach is much more reliable, but requires a large library of stored models, and a vast amount of knowledge about the various images these models may generate.

The second approach is manifested in such techniques as shape-from-shading and photometric stereo. These "shape-from" techniques are limited by the quality of illumination available. They have only proven successful in controlled experiments with simple shapes. Also, the "shape-from" techniques only generate surface normals. Reconstructing a unique surface shape from these normals is not always possible.

Another method for generating shape directly from the optical image is stereo vision. In stereo vision, simultaneous images from cameras separated by a small distance are correlated so that points in the two images that correspond to the same physical location are matched. From knowledge of camera placement and the disparity between two matched points, the 3D location of the corresponding physical point can be computed. The most difficult aspect of this procedure is the correlation between images. Seldom is a perfect match found throughout the image, and specular points present particularly troublesome matches. Stereo is, however, a very promising 3D vision technique and most of the space robotic vision systems under design make use of it.

Application of Sensor Fusion

A free-flying space robot needs detailed information about the location of objects in its workspace and the shape of individual objects. The most common sensors for acquiring this information are electronic cameras sensitive to optical wavelengths. The space environment, however, presents unique problems to an optical 3D shape sensing system. The lack of atmosphere creates deep shadows and intense illumination. Specular points become very bright, and shadowed edges are indistinguishable against dark backgrounds. These problems cannot always be easily overcome by simple image processing or enhanced vision methods. Sensory data from some independent physical regime must be used to augment a purely optical robot sensor system.

The goal of a sensor fusion system may be to localize objects within a robot workspace, or to determine the shape of individual objects. The application considered here is extracting the shape of 3D objects. Various sensors which have been studied by researchers for robotic applications include multiple camera views, multiple processes on a single view, tactile sensors, laser range images, and ultrasonic imaging. Our invention has focused on the fusion of camera images with electromagnetic scattering data of conventional bandwidths (not high resolution) and frequencies, i.e. X band, Ku band, etc., to determine the shape of remote 3D objects in space.

Ideally, a robot working in space would use high-resolution microwave imaging to augment its tactile and optical sensors. This type of system requires large bandwidth, multiple viewing angles, and sophisticated signal processing, and produces an image consisting of intense regions at points of specularity. The technology and equipment required for such a system is, however, prohibitively cumbersome and expensive for many applications, and interpretation techniques lag behind the imaging technology. An alternative to microwave imaging is the use of polarized radar scattering cross-sections (RCSs). The RCSs do not yield high-resolution images, but the analysis of depolarization can provide important shape information about the scattering surface; especially at the specular point, where the optical image often fails. To circumvent the ambiguity of the RCS, the incomplete optical image can be used to guide the conversion of RCS into shape. The resulting scattering surface shape description is more complete than can be derived from the RCS or the camera image alone.

The main contribution of this investigation has been the development of numerical methods that determine some characteristics of a surface from an incomplete optical image and the observed RCS. This is done by modeling the unknown characteristic of a surface by some parameter vector and applying a non-linear-least-squares algorithm to minimize the difference between the observed RCS and a theoretical RCS that results from the parameterized surface model. The optical image is used to provide an initial estimate of the parameterized surface. The success of such a method depends to a large extent on the accuracy of the theoretical RCS model used. Models using the geometrical theory of diffraction, moment methods, and physical optics have been considered. Another limitation on the success of the method is the type and quality of information input to the system. However, in a typical application a configuration such as the one shown symbolically in FIG. 2 may be used.

An application of particular interest is one in which the method of moments is used to model the RCS. Although this involves the numerical solution of a complex integral equation, it is significant because it allows the computation of microwave scattering from arbitrary surfaces. Simpler modeling techniques such as the geometrical theory of diffraction or physical optics constrain the scattering target to simple geometric shapes such as cylinders and plates. The method of moments requires that the currents on the surface of the scattering object be expanded in some orthonormal basis. Without some independent shape information, no constraints exist on the shape and configuration of these basis functions. This information must be derived from the optical image. It can be shown that non-linear error minimization employing the method of moments is simplified if the shape and configuration of the basis functions remain fixed throughout the procedure (See, "Microwave and Optical Sensor Fusion for the Shape Extraction of 3D Space Objects"; a doctoral Thesis of Scott W. Shaw, Rice University; Houston, Tex., April, 1988). These observations indicate that the optical image is essential to the feasibility of this technique. We have employed the assumption that the occluding contours are known at the outset and can be extracted from the camera data using standard image processing techniques.

Several simulations and experiments were performed demonstrating the application of the RCS/image sensor fusion system. The invention involves a method for building a three-dimensional (3D) surface model of a remote object from a single digital camera image and a set of polarized radar scattering cross-sections. As previously stated, in space, camera images are difficult to analyze because light does not behave as it does in the atmosphere. Intensely bright areas and deep shadows in the image create problems for standard shape extraction techniques such as shape-from-shading, photometric stereo, and stereopsis. Often the resulting 3D surface model is incomplete. Our technique for improving this surface model is to use it as a first approximation in an iterative scheme that minimizes the difference between theoretically predicted cross-sections and observed cross-sections. We have demonstrated this technique on three problems. The first was to determine a missing edge of a flat plate. The second was to determine the size and rotation in the horizontal plane of an ellipsoid. The third was to recover the shape of an interior surface patch on an arbitrarily shaped scattering target.

Application 1

This application involved determining an edge of a perfectly conducting, rectangular, flat plate that has been lost in shadow. The steps in the process are:

1. Obtain an approximate orientation of the plate by stereopsis.
2. Enhance edges in the camera image.
3. Threshold the edge-enhanced camera image.
4. Extract the three visible boundaries of the plate from the thresholded camera image.
5. Determine the width of the plate and, hence, the missing edge, using a GTD scattering model to generate theoretical radar cross-sections of the plate (see R. A. Ross, "Radar Cross Sections of a Rectangular Flat Plate as a Function of Aspect Angle", IEEE Transactions on Antennas and Propagation, Vol.AP-14, No. 3, pp329-335, May, 1966), and minimizing the difference between these theoretical cross-sections and the observed cross-sections using the program "lmdif()" found in the MINPACK group of programs published by Argonne National Laboratories.

Application 2

The second application was to build a model of a perfectly conducting ellipsoid rotated in the horizontal plane. The following steps describe this application:

1. Enhance the edges of the camera image.
2. Threshold the edge-enhanced image.
3. Determine the vertical axis of the ellipsoid directly from the thresholded, edge-enhanced image.
4. Determine the apparent width of the ellipsoid in the horizontal plane from the thresholded, edge-enhanced image.
5. Determine the other two axes and the rotation in the horizontal plane by generating a geometrical optics cross-section (see G. T. Ruck, D. E. Barrick, W. D. Stuart, and C. K. Kirchbaum, *Radar Cross-section Handbook*, Vol. 1, Plenum Press, New York, 1970), a first order approximation to the cross-polarized cross-section (see S. J. Choudhuri and W. M. Boerner, "A Monostatic Inverse Scattering Model Based on Polarized Utilisation," Appl Phys., Vol.11, pp337-350, 1976), and minimizing the difference between the theoretically generated cross-sections and the observed cross-sections, again using the "lmdif()" routine.

Application 3

This application involved building a model of an arbitrary surface given the scattering cross sections and a degraded optical image. The image is degraded only around the specular point of the scattering object. The reconstruction procedure is:

1. Using shape-from-shading, photometric stereo, or streopsis, construct a model of the visible portion of the target surface everywhere except in a patch surrounding the specular point of the target.
2. Describe the specular patch of the model by a spline surface.
3. Determine the exterior knots of the spline patch from the camera-generated model.
4. Solve for the interior knots of the spline patch by generating co-polarized and cross-polarized scattering cross-sections by a moment-methods technique (see R. F. Harrington, *Field Computation by Moment Methods*. The Macmillan Company, New York, 1968), and minimizing the difference between these theoretical cross-sections and the observed cross-sections, again using the "lmdif()" routine. A reliable moment-method code is the "Numerical Electromagnetic Code," published by Ohio State University.

The first two applications included experimental data as well as simulations, whereas the third was simulated only. The results show that surfaces can be recovered with very little error when the polarized RCS and certain parameters from the camera image can be measured accurately.

In developing the invention, it was observed that optical sensing in the space environment does not always provide enough information to reconstruct 3D surfaces. The fusion of radar scattering data with the camera images was proposed as a solution to this problem. Specifically, the use of polarized radar scattering cross-sections was suggested. It is an objective of the invention to produce sensor fusion resulting in workspace interpretation which is better than the component interpretations in the sense of either confidence or completeness. The goal was to show that such a fusion is possible. Certainly, fusion was achieved. The complete surfaces were indeed recovered from the component interpretations. Also, it could be said that the confidence in the final surface was increased over the individual components. The component interpretations cooperated to achieve a correct solution, i.e. the independent sensors perceived the same physical object.

The overall favorable results of the applications, however, should be interpreted in light of the simplifications that were made. First of all, the problems were designed with the application in mind, also, these were not the most difficult situations imaginable. In particular, the plate and ellipsoid were scattering geometries which would probably seldom occur in a real space robotic situation, on the other hand, many complex scattering geometries can be approximated as collections of smaller, simple objects. The cylinder, in particular, has a well-known and easily predictable RCS; it is one of the most thoroughly studied scattering geometries in existence since exact solutions to the wave equation are available for this case. The RCS of spacecraft, satellites, etc. are often computed by a scattering code which models complex objects as connected cylinders of various shapes. Thus, recovering the shape of simple scattering geometries is a first step to developing solutions for more complex geometries. The plate was chosen for its well-known and accurate closed-form RCS expression, but the ellipsoid has no such expression. The ellipsoid remains one of the most difficult scattering problems, and the prediction of diffraction patterns for general ellipsoids is still a research problem. It is encouraging, therefore, that good results were obtained for the ellipsoid, even though gross simplifications were made in computing the RCS. The time-domain scattering results were essential here, since the specular return, for which the simplifications hold, could be separated from the creeping wave reflection.

The hidden simplification in the design of the arbitrary surface experiment is that the surface used to generate the observations was constructed in the same way as the approximation surface. Splines of the same degree were used to define both surfaces, so an exact solution was always possible. A better test of this method would be to construct the surface used to generate the observations from splines of a higher degree than those used to model the scattering response. Alternately, the observation-generating surface could be defined arbitrarily, with no reference to splines, perhaps containing sharp corners or other features that cannot be exactly represented by continuous functions. The results of a spline approximation in such a case would reveal insights about the usefulness of the shape reconstruction technique applied to truly arbitrary surfaces.

Another simplification that affected the outcome of the experiments is the assumption that the scattering targets are perfectly conducting. In practice, this condition is seldom met, although it may be approximated in certain space objects. If the target is not perfectly conducting, its dielectric constant must be determined along with the target shape. In addition, the scattered field expressions increase in complexity. While this difficulty is not insurmountable, its addition increases the number of surface parameters that must be determined, and therefore places more demands on the number of observations.

One last assumption that was made and that is seldom achieved in a real space situation is target stationary. Usually, objects are rotating about some axis and moving translationally with respect to the sensor. This creates Doppler shifts in received radar frequency, and target scintillation. While Doppler shift is desirable in target tracking situations, it creates problems for RCS measuring systems. One way in which this might be overcome is to use a laser range sensor to determine target velocity and predict Doppler shift.

In the flat plate and arbitrary surface simulations it was seen that the purely numerical error minimization procedure alone did not always converge to the correct solution. This was overcome by comparing the residual error at convergence to a threshold related to the noise variance of the data. If the residual was greater than the threshold, the initial parameter was perturbed slightly and the numerical procedure started again. This need for supervision in order to ensure global convergence even in the simplest case points out the limitations of a purely numerical algorithm. In order to implement such adjustment a supervisory system would have to be incorporated in a given application as represented symbolically by the intelligent module of FIG. 2.

Overall, the results of the our work demonstrate that there is merit in using information from some independent source to guide the inversion of electromagnetic data. Previous work in shape determination from scattering data has concentrated on the scattered electromagnetic field as the sole source of information. Much of this previous work consisted of attempts to regularize the ill-posed inversion problem The ill-posed nature of the inversion problem stems from the lack of complete information about the scattered field. If information from some other physical regime is available about the scattering target it can be used to complement the limited scattered field description. In our case, this has been accomplished by using the camera information to reduce the number of unknown surface parameters.

SUMMARY OF THE INVENTION

The invention comprises method and apparatus for fusion of data from optical and radar sensors by error minimization procedure. The method has been applied to the problem of shape reconstruction of an unknown surface at a distance. The method involves deriving a surface model (which may be incomplete) from an optical sensor. The unknown characteristics of the surface are represented by some parameter. The correct value of the parameter is computed by iteratively generating theoretical predictions of the Radar cross-sections (RCS) of the surface, comparing the predicted and the observed values for the RCS, improving the surface model from results of the comparison, and repeating the process until the difference between the predicted and observed values are below an acceptable threshold. Theoretical RCS may be computed from the surface model in several ways. One RCS prediction technique is the method of moments. The method of moments can be applied to an unknown surface only if some shape information is available from an independent source. The optical image provides the independent information.

The present invention presents a new system for extracting the 3D shape of space objects using optical images and the polarized RSC. The system works by describing the unknown surface parametrically and, using electromagnetic modeling techniques, minimizing the error between the predicted and the observed polarized RCS set. The optical image is incorporated by providing an initial estimate of the scattering surface shape. Obviously, the success of such a method is highly dependent on the modeling technique used. Many choices are available, but the one employed was the *Method of Moments* (MM), (see Roger F. Harrington, "Field Computation by Moment Methods", The Macmillan Company, New York, 1968.) This modeling procedure has been shown to be accurate under properly controlled conditions. The state of the art in electromagnetic modeling is still developing, and best results are obtained for simple, perfectly conducting objects. Such simple objects would include plates, ellipsoids, polygonal solids, and perhaps a rudimentary satellite model. However, more powerful computers and microwave equipment should be available in the future, making much more accurate modeling possible for more complex targets. Radar systems now exist for measuring range, range rate, scattered amplitude, and scattered phase in various polarizations. Research is progressing on systems that will construct images of remote objects using wideband microwave measurements taken over a variety of scattering angles. These wideband radar imaging systems would be an ideal complement to optical imaging in space. They are, however, extremely complex and require much signal processing. In addition, the resulting image is often difficult to interpret, yielding intense blobs at the target's so-called scattering centers. A wideband radar image would certainly be useful to a space robot, but is difficult and expensive to obtain. Instead, the present invention utilizes shape information that is available from the returns of simple, currently available, microwave radar systems.

Accordingly, it is, therefore, an object of the invention to employ the use of simple radar to obtain polarized RCS for shape determination.

It is a further objective of the invention to use iterative error minimization.

It is a still further object of the invention to integrate an optical image and radar data.

It is a yet further object of the invention to use an optical image to provide a first approximation of the target shape.

It is an even further object of the invention to identify novel shapes without the requirement of matching an image from a preexisting library.

BRIEF DESCRIPTION OF THE DRAWINGS

The objects, advantages and features of the invention will become more apparent by reference to the drawings which are appended hereto and wherein an illustrative embodiment of the invention is shown, of which.

DESCRIPTION OF THE PREFERRED EMBODIMENT

The Radar Scattering Cross-section (RCS) is the ratio of scattered to incident power normalized for wavelength, range and antenna gain. The co- and cross-polarized RCS yield some shape information about the scattering object. By considering the RCS in conjunction with an imperfect optical image, an object surface characterization is derived which is more reliable and complete than those derived from either data set taken alone.

Figure 1:
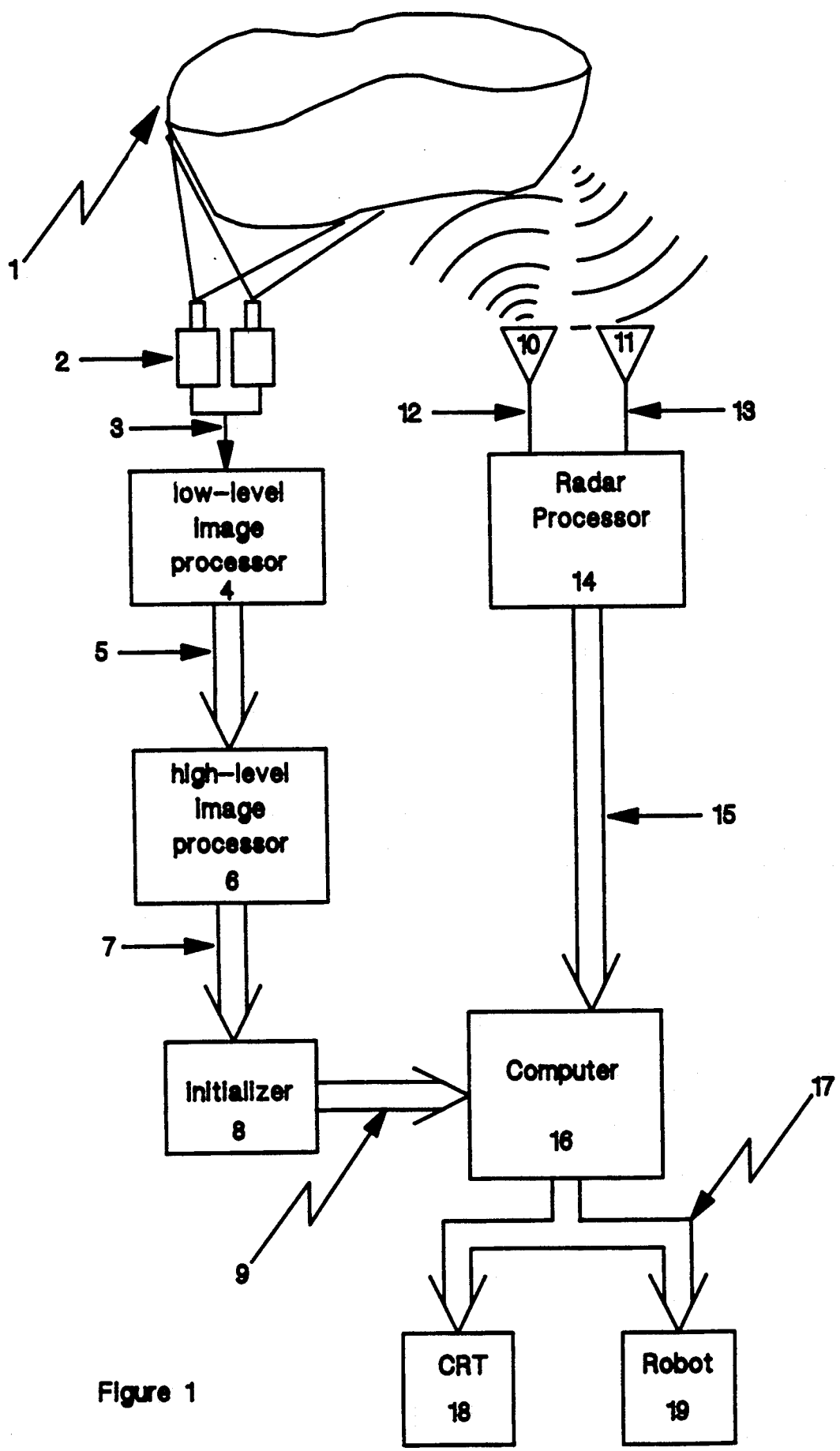
FIG. 1 is a schematic diagram of the system.
Figure 2:
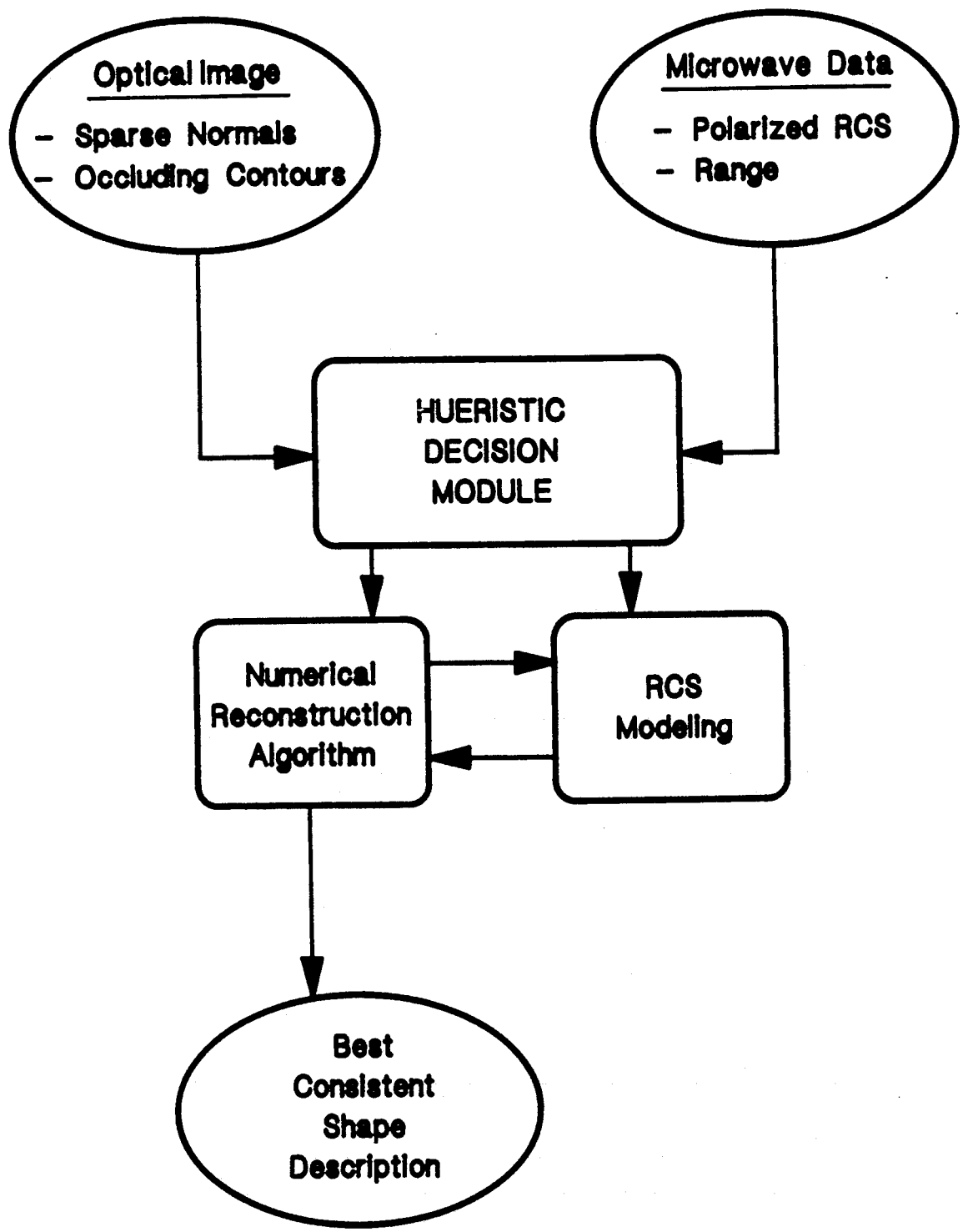
FIG. 2 is a symbolic representation of the system for use in a working space robot.
Figure 3:
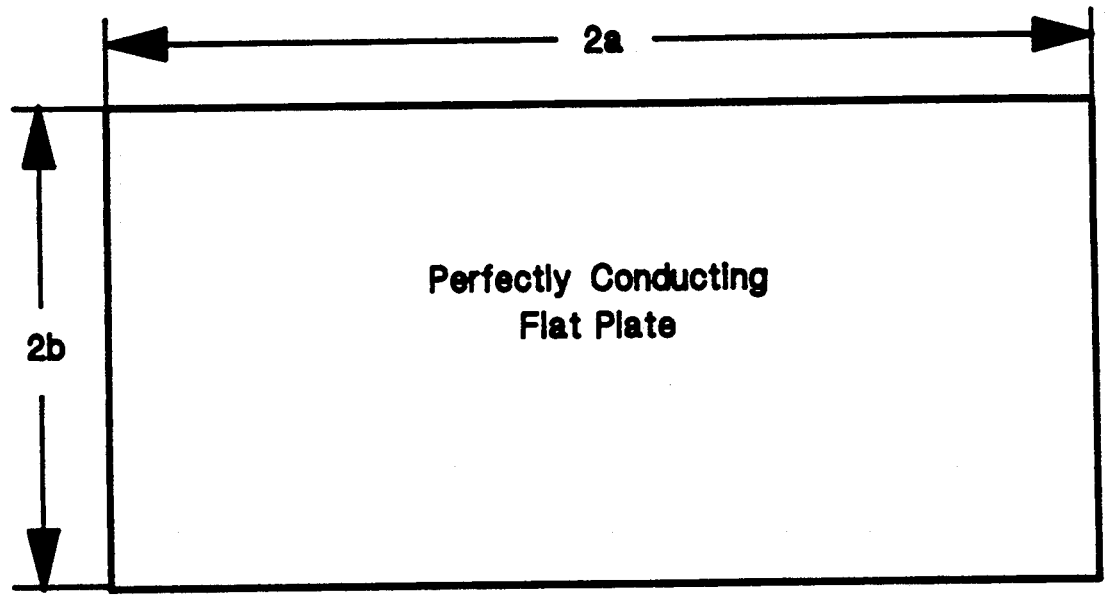
FIG. 3 illustrates a dimensioned, perfectly conducting, rectangular flat plate as used in reconstruction problem.
Figure 4:
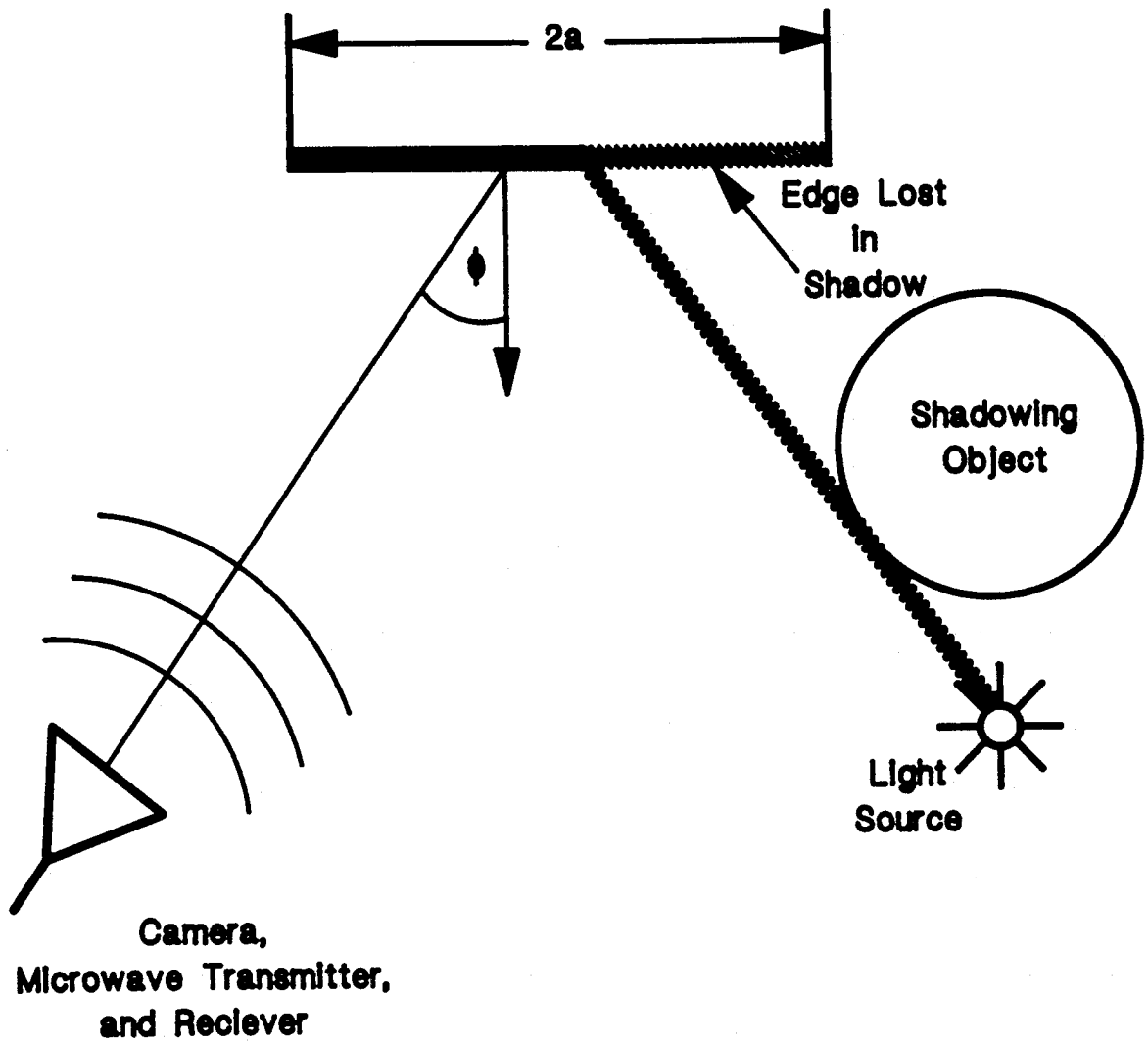
FIG. 4 is a plan view diagram illustrating the flat plate edge reconstruction problem. The right-hand edge of the plate is lost in shadow and will be determined using the method of the invention.
Figure 5:
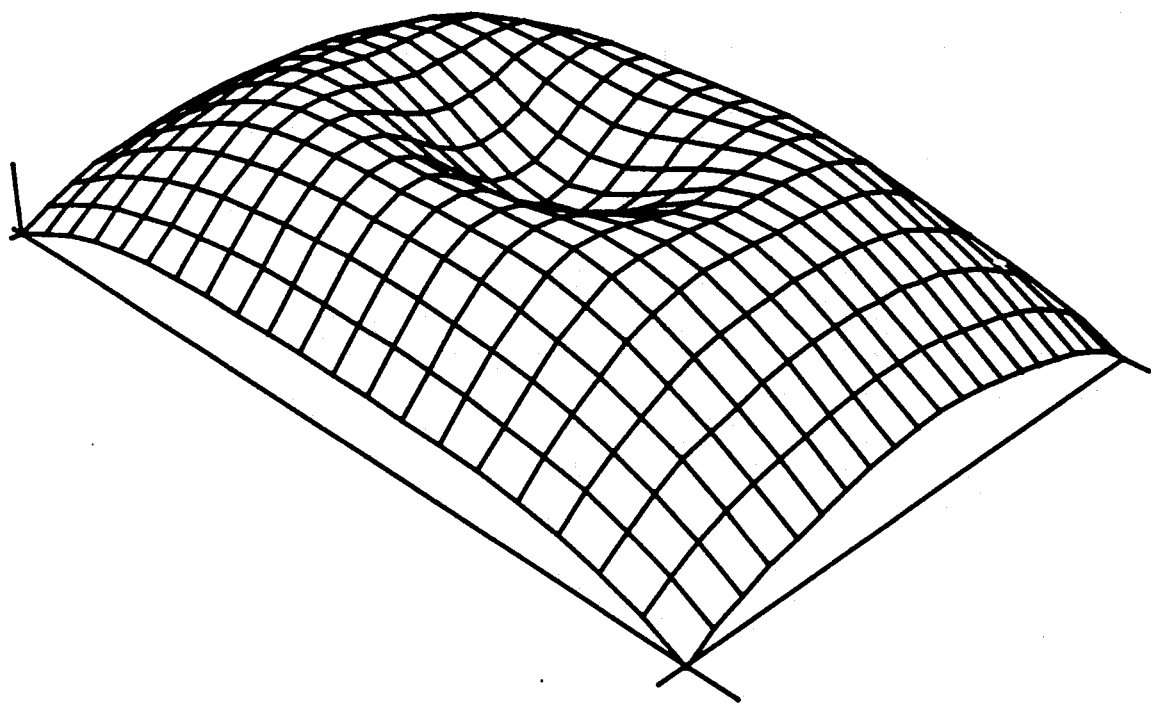
FIG. 5 is an illustration of the top portion of an arbitrary surface whose specular region is to be reconstructed. The peripheral details are known from the optical image, and the central portion is recovered using the RCS data by the method of the invention.

An embodiment of the invention can best be described in reference to FIG. 1.

A target object of unknown shape (1) lies in free space. An object of this invention is to determine the shape of this target in the greatest possible detail. This is done by combining the outputs of an image sensor (2), and a radar measurement system (10-14). The outputs of these sensors are combined by image processors (4, 6), and a computer (16) for eventual display on a CRT (18), or use by a Robot (19).

The image sensor (2) is composed of one or more cameras which consist of an aperture and a light sensitive element such as a charge-coupled device (CCD) array. The light sensitive element converts the sensed image into an analog video signal. Multiple cameras are required for stereo imaging, otherwise a single camera is used. The analog video signal is transferred to the low-level image processor (4) via a coaxial cable (3).

The low-level image processor (4) is an electronic circuit that may be implemented as a general purpose computer with specialized programming or as a series of specialized circuit boards with a fixed function. The low-level image processor (4) collects the analog video signal for each frame and converts it to a digital form. This digital image is an array of numbers stored in the memory of the low-level image processor (4), each of which represents the light intensity at a point on sensing element of camera (2). When stereo imaging is used, this may be done for multiple video signals simultaneously. The low-level image processor (4) may also perform certain filtering operations on the digital image such as deblurring, histogram equalization, and edge enhancement. These operations are well-known and fully described in the literature, see for example, K. R. Castleman, "Digital Image Processing", Prentice-Hall, Englewood Cliffs, N.J., 1979.

The digital image, thus enhanced, is transferred via a digital data bus (5) to the high-level image processor (6).

The high-level image processor (6) may also be either a hard-wired circuit or a general purpose computer. The high level image processor (6) takes the enhanced digital image and attempts to extract shape information from it by various means including shape-from-shading, or in the case where multiple cameras are used, stereopsis or photometric stereo. These are also well-known operations and are described in the literature, (for example, see Berthold Klaus Paul Horn, "Robot Vision", Cambridge, Mass., MIT Press, 1986.) When multiple cameras are used in the image acquisition and processing system (2-5), the multiple images are combined at the high-level image processor (6). The high-level image processor (6) produces an incomplete surface model of the unknown object (1). The surface model is a list of digitally stored data, each of which consists of three numbers that are the x, y, and z locations of a point on the object's surface. The incompleteness of the surface model may result from regions on the object's surface that are, for some reason, not understood by the high-level image processor (6). The incomplete surface model is passed on to the initializer (8) by a digital data bus (7).

The initializer (8) is a general-purpose computer or digital circuit that "fills in" the portions of the surface model left incomplete by the high-level image processor (6). The unknown areas of the surface model are computed by surface functions such as B-splines that depend on some numerical parameter p. This surface approximation technique is well-known and is described in books such as "Geometric Modeling" by Michael E. Mortenson, Wiley, New York, 1985.

The surface functions are represented digitally in a form that both the initializer (8) and the computer (16) understand. The surface functions along with the incomplete surface model are passed on to the computer (16) by a digital data bus (9). The computer (16) will determine the correct value of the parameter p in the manner hereafter described.

Concurrently with collection of the images by the cameras (2), a radar cross-section (RCS) of the unknown object (1) is being measured by the radar system (10-14). The radar system consists of a radar processor (14), antennas (10, 11) and waveguides (12, 13). The radar processor (14) is a widely-available device, and all of the functions described here can be performed by a unit such as the Hewlett-Packard 8510 Network Analyzer. The method by which they may be performed is described in Hewlett-Packard's product note #8510-2. The radar processor (14) generates a microwave signal that is transmitted along the waveguide (12) and radiated by the transmitting antenna (10). The electromagnetic field is diffracted by the object (1) and collected by the receiving antenna (11). The diffracted signal is transmitted back to the radar processor (14) by a waveguide (13). The radar processor (14) computes the RCS of the unknown object (1). The RCS is represented digitally by the radar processor (14), and transferred to the computer (16) by a digital data bus (15).

The computer (16) performs the comparisons and iterations using two pieces of widely available software. The first is the MINPACK package of non-linear minimization programs published by Argonne National Laboratory, and the second is the Numerical Electromagnetic Code (NEC) available from Ohio State University. The NEC code generates theoretical approximations of the RCS of the object (1) using the surface model produced by the initializer (8). The MINPACK program "lmdif()" uses these approximate RCSs to compute the correct value of the parameter p by an iterative scheme known as "nonlinear least squares". This method allows computation of the correct value of p by minimizing the difference between the observed RCS acquired by the radar system (10-14) and the theoretical RCS computed by the NEC code from the incomplete surface model. Using the correct value of p, along with the incomplete surface model and surface functions from the initializer (8), the computer generates a complete surface model.

The Appendices include exemplary listings showing the manner in which the invention was implemented in specific embodiments. As with all computer programs, they must be written for the particular hardware and carefully debugged. The appendices are useful examples of one implementation.

Appendix I contains listings of exemplary program for determining surface parameter vector from an observation vector and for computing the polarized RCS for a closed ellipsoid having specular patch and for minimizing the sum of squares of the vector.

Appendix II contains listings of exemplary program to compute the polarized RCS for an ellipsoid with specular patch computed with a B-spline fit.

Appendix III contains listings of exemplary program to compute a specular patch for a closed ellipsoid.

Appendix IV contains listings of exemplary program to generate a grid on an ellipsoid surface Appendix V contains listings of exemplary programs to do a point matching solution to the MFIE on a grid on n points p, with normals in the array n.

While a particular embodiment of the invention has been shown and described, various modifications are within the spirit and scope of the invention. The appended claims are, therefore, intended to cover all such modifications.

Appendix I

```
#include <math.h>
#define PI 3.141592654
#define K (2.0*PI/1.28)
#define B 3.25
#define N 2
#define M 3
#define LWA (M*N+5*N+M)
#define MAXFEV 100
#define MODE 1 /* variables scaled internally*/
#define FACTOR 100.0
#define NPRINT -1
#define TOL 3.7253e-09
#define THRESH 1e-8
#define PERT (1.25/16.0) /* perturb by lambda over 16 */
#define MAXPERT 1
#define TRUE 1
#define FALSE 0
#define BIGNUM 2147483647
#define SCALE1 1.0
#define SCALE2 100.0
define SCALE3 10.0 double sigmao[M],enorm_(),gauss();
double k,phix;
int fcncnt;

double dpmpar_(i)
int *i;
{
 double result;
 if(*i == 1){
    result = 1.0;
    while((result/2.0 + 1.0) != 1.0)
      result /= 2.0;
    return(result);
 }
 else if(*i == 1)
    return(TOL);
 else
    return(HUGE);
} function(m,n,x,fvec,iflag)
int *m,*n,*iflag;
double x[],fvec[];
{
 double dummy;
 fcncnt++;
 rcs_ellip(1.0,0.0,&fvec[0],&fvec[1],x[0],x[1]);
 fvec[0] *= SCALE1; fvec[0] -= SCALE1*sigmao[0];
 fvec[1] *= SCALE2; fvec[1] -= SCALE2*sigmao[1];
 rcs_ellip(0.0,1.0,&dummy,&fvec[2],x[0],x[1]);
 fvec[2] *= SCALE3; fvec[2] -= SCALE3*sigmao[2];
 if (fcncnt > MAXFEV)
    *iflag = -1;
}
```

```
/*
 * A program to determine some surface parameter vector of length N given
 * an observation vector of length M. The routine function() calls a program
 * rcs_ellip() which computes the polarized RCS for a closed ellisoid with a
 * B-spline-fit specular patch. The parameters are z-heights for the internal
 * knots of the B-spline patch. Subroutine lmdifl() is the Levenberg-Marquardt
 * algorithm for minimizing the sum of squares of the vector computed by
 * function().
 */ main(argc,argv)
int argc;
char * argv[];
{
  static int n=N,m=M,lwa = LWA, narg = 1;
  int i,j,info,nfev,iwa[N],(*fcn)();
  int terminate, npert;
  double tol, resid,noise,z;
  double x[N],fvec[M],wa[LWA];
  double enorm;
  /* initialize x */
  for(i=0;i<N;i++){
    x[i] = atof(argv[narg++]);
  }
  fcn = function;
  for(i=0;i<M;i++){
    sigmao[i] = atof(argv[narg++]);
  }
  /* add noise to observations */
  noise = atof(argv[narg++]);
  for(i=0;i<M;i++)
    sigmao[i] += noise*gauss();
  tol = TOL;
  /* call lmdiff */
  fcncnt = 0;
  lmdifl_(fcn,&m,&n,x,fvec,&tol,&info,iwa,wa,&lwa);
  resid = enorm_(&m,fvec);
  printf("\nx[0] = %g, x[1] = %g, residual = %g\n",x[0],x[1],resid);
  printf("%d function evaluations",fcncnt);
}
```

Appendix II

```
#include "mommeth.h"
#define LAMBDA 1.25
#define D(A) (delphi+A)
#define MG 5 /* number of radial grid lines */
#define NG 4 /* radial distance division (NG-1 points on each line) */
#define NPTS (MG*(NG-1)+1)

/*
 * A program to compute the polarized RCS for an ellipsoid with specular patch
 * computed with a B-spline fit.
 */ rcs_ellip(hxi,hyi,sigmaxx,sigmaxy,parm1,parm2)
double hxi,hyi; /* the incident magnetic field magnitudes */
double *sigmaxx,*sigmaxy;
double parm1,parm2;
{
  static THREEVEC p[NPTS], norm[NPTS];
  static double alpha[NPTS], x0 = 0.0, y0 = 0.0, z0 = 25.0, a = 0.75*LAMBDA, b = 0.5*LAMBDA,
  static int n = NPTS;
  CMPLXTHREEVEC *delphi;
  complex kernel[3*NPTS][3*NPTS], h[3*NPTS], l[3*NPTS], htrans[3*NPTS], astarx[3*NPTS], asta
  double d, partzx, partzy, xbound,ybound;
  int i,j,k;
  delphi = (CMPLXTHREEVEC *)malloc(n*n*sizeof(CMPLXTHREEVEC));
  n=closed_e_grid(a,b,c,MG,NG,p);
  /* compute normals */
  for(j=0;j<n-1;j++){
    alpha[j] = 1.0;
    partzx = c*c*p[j].x/(a*a*fabs(p[j].z));
    partzy = c*c*p[j].y/(b*b*fabs(p[j].z));
    norm[j].x = partzx/sqrt(1.0 + partzx*partzx + partzy*partzy);
    norm[j].y = partzy/sqrt(1.0 + partzx*partzx + partzy*partzy);
    if(p[j].z > 0)
      norm[j].z = 1.0/sqrt(1.0 + partzx*partzx + partzy*partzy);
    else
      norm[j].z = -1.0/sqrt(1.0 + partzx*partzx + partzy*partzy);
  }
  xbound = a * 2.0/3.0; ybound = b * sqrt(1.0 - (4.0/9.0));
  comp_spec_patch(a,b,c,xbound,ybound,parm1,parm2,p,norm);
  d = z0*z0;
  gradient_phi(p,delphi,n,2.0*PI/LAMBDA);
  build_k_matrix(norm,delphi,kernel,n);
```

```
build_h_array(h,p,norm,n,2.0*PI/LAMBDA,x0,y0,z0,hxi,hyi);
build_a_array(astarx,astary,p,norm,2.0*PI/LAMBDA,d,n);
solve_for_l(kernel,astary,l,n);
hermtrans(h,htrans,3*NPTS,1);
cmmult(htrans,l,&hsc,1,3*NPTS,1);
*sigmaxx = (hsc.re*hsc.re+hsc.im*hsc.im);
solve_for_l(kernel,astarx,l,n);
hermtrans(h,htrans,3*NPTS,1);
cmmult(htrans,l,&hsc,1,3*NPTS,1);
*sigmaxy = (hsc.re*hsc.re+hsc.im*hsc.im);
free(delphi);
}
```

Appendix III

```
#define ZH(A,B) c*sqrt(1.0 - pkl[A][B].x*pkl[A][B].x/(a*a) - pkl[A][B].y*pkl[A][B].y/(b*b)

/*
 * This program somputes a specular patch for a closed ellipsoid.  The surface
 * patch is controlled by the array Pkl[][].
 */ comp_spec_patch(a,b,c,xbound,ybound,parm1,parm2,p,norm)
double a,b,c,xbound,ybound,parm1,parm2;
THREEVEC p[NPTS],norm[NPTS];
{
 THREEVEC pkl[3][4];
 double u,w,theta;
 int i;
 pkl[0][0].x = -xbound;       pkl[0][0].y = ybound;   pkl[0][0].z = ZH(0,0);
 pkl[0][1].x = -xbound/3.0;   pkl[0][1].y = ybound;   pkl[0][1].z = ZH(0,1);
 pkl[0][2].x = xbound/3.0;    pkl[0][2].y = ybound;   pkl[0][2].z = ZH(0,2);
 pkl[0][3].x = xbound;        pkl[0][3].y = ybound;   pkl[0][3].z = ZH(0,3);
 pkl[1][0].x = -xbound;       pkl[1][0].y = 0.0;      pkl[1][0].z = ZH(1,0);
 pkl[1][1].x = -xbound/3.0;   pkl[1][1].y = 0.0;      pkl[1][1].z = parm1;
 pkl[1][2].x = xbound/3.0;    pkl[1][2].y = 0.0;      pkl[1][2].z = parm2;
 pkl[1][3].x = xbound;        pkl[1][3].y = 0.0;      pkl[1][3].z = ZH(1,3);
 pkl[2][0].x = -xbound;       pkl[2][0].y = -ybound;  pkl[2][0].z = ZH(2,0);
 pkl[2][1].x = -xbound/3.0;   pkl[2][1].y = -ybound;  pkl[2][1].z = ZH(2,1);
 pkl[2][2].x = xbound/3.0;    pkl[2][2].y = -ybound;  pkl[2][2].z = ZH(2,2);
 pkl[2][3].x = xbound;        pkl[2][3].y = -ybound;  pkl[2][3].z = ZH(2,3);
 for(i=0;i<MG;i++){
   theta = i*2.0*PI/MG;
   w = 0.5 + 0.5*cos(theta);
   u = 0.5 - 0.5*sin(theta);
   findpt(u,w,&p[i*(NG-1)],pkl);
   find_normal(u,w,&norm[i*(NG-1)],pkl);
 }
 findpt(0.5,0.5,&p[NPTS-1],pkl);
 find_normal(0.5,0.5,&norm[NPTS-1],pkl);
}
```

Appendix IV

```
/*
 * A program to generate a grid on an ellipsoidal surface with x, y, and z
 * axes equal to a,b, and c respectively. The grid is radial, with k radiating
 * lines of l-1 points on each.  A grid point is also placed at the center.
 * The total number of points generated is (k*(l-1))+1.
 */
#include "mommeth.h"
#define EDGEDIST 0.9  /* distance from center fo edge points */
#define BACKDIST 0.5  /* distance from center for ring of points on backside */
#define P(A) (p+(A))

closed_e_grid(a,b,c,k,l,p)
double a,b,c;
int k,l;
THREEVEC *p;
{
 int i,j,pctr;
 double theta;
 pctr = 0;
 for(i=0;i<k;i++){
       theta = i*2*PI/k;
       for(j=1;j<l;j++){
          if(j == l-1){
             P(pctr)->x = BACKDIST*a*cos(theta);
             P(pctr)->y = BACKDIST*b*sin(theta);
             P(pctr)->z = - c*sqrt(1.0 - P(pctr)->x*P(pctr)->x/(a*a) - P(pctr)->y*P(pctr)->y
             pctr++;
          }
          else {
```

```
            if(j == l-2){ /* place outer points close to edge */
               P(pctr)->x = EDGEDIST*a*cos(theta);
               P(pctr)->y = EDGEDIST*b*sin(theta);
            }
            else {
               P(pctr)->x = (double)j*(1.0/(double)l)*a*cos(theta);
               P(pctr)->y = (double)j*(1.0/(double)l)*b*sin(theta);
            }
            P(pctr)->z = c*sqrt(1.0 - P(pctr)->x*P(pctr)->x/(a*a) - P(pctr)->y*P(pctr)->y/(
            pctr++;
         }
      }
   }
 P(pctr)->x = 0.0;
 P(pctr)->y = 0.0;
 P(pctr++)->z = c;
 return(pctr);
}
```

Appendix V

```
#include "mommeth.h"

#define H(A)    (h+(A))
#define P(A)    (p+(A))
#define N(A)    (norm+(A))

#define DEL(A,B)  (del+(A)*n+(B))
#define ALPHA(A)  (alpha+(A))

#define AX(A)   (ax + (A))
#define AY(A)   (ay + (A))

#define A1(B,C)  (a1+(B)*3*n+(C))
#define L(A)    (l+(A))
#define A(B,C)  (a+(B)*3*n+(C))

/*
 * A collection of programs to do a point-matching solution to the MFIE
 * on a grid of n points p, with normals in the array n.
 */ build_h_array(h,p,norm,n,k,x0,y0,z0,h0x,h0y)
complex *h;         /* h array - to be computed */
THREEVEC *p,*norm;  /* p is grid point array, norm is surface normal array*/
int n;              /* surface grid dimensions */
double k;           /* wavenumber */
double x0,y0,z0;    /* source location */
double h0x,h0y;     /* linearly polarized components of H inc */
{
 int i,j;
 complex temp1,temp2;
 for(i=0;i<n;i++){
         temp1.re = 0.0;
         temp1.im = k*(P(i)->z - z0);
         cexp(&temp1,&temp2); /* temp2 = exp{jkz} */
         if(P(i)->z > 0){
            H(i)->re = -2.0 * N(i)->z * h0y * temp2.re;
            H(i)->im = -2.0 * N(i)->z * h0y * temp2.im;
            H(i+n)->re = 2.0 * N(i)->z * h0x * temp2.re;
            H(i+n)->im = 2.0 * N(i)->z * h0x * temp2.im;
            H(i+2*n)->re = 2.0 * (N(i)->x*h0y - N(i)->y*h0x) * temp2.re;
            H(i+2*n)->im = 2.0 * (N(i)->x*h0y - N(i)->y*h0x) * temp2.im;
         }
         else{
            H(i)->re = 0.0;
            H(i)->im = 0.0;
            H(i+n)->re = 0.0;
            H(i+n)->im = 0.0;
            H(i+2*n)->re = 0.0;
            H(i+2*n)->im = 0.0;
         }
      }
}
```

```c
build_k_matrix(norm,del,a,n)
THREEVEC *norm;         /* m*n long array of normal vectors */

CMPLXTHREEVEC *del; /* the gradient of the green's function */
complex *a;         /* the a matrix - to be determined */
int n;              /* dimension of the surface grid */
{
 complex *axx,*axy,*axz,*ayx,*ayy,*ayz,*azx,*azy,*azz;
 int i,j;
 allocate_blocks(&axx,&axy,&axz,&ayx,&ayy,&ayz,&azx,&azy,&azz,n);
 build_blocks(axx,axy,axz,ayx,ayy,ayz,azx,azy,azz,norm,del,n);
 assemble_blocks(a,axx,axy,axz,ayx,ayy,ayz,azx,azy,azz,n);
 free_blocks(&axx,&axy,&axz,&ayx,&ayy,&ayz,&azx,&azy,&azz);
 for(i=0;i<3*n;i++)
        for(j=0;j<3*n;j++){
                        A(i,j)->re /= 2.0*PI;
                        A(i,j)->im /= 2.0*PI;
                        }
} allocate_blocks(axx,axy,axz,ayx,ayy,ayz,azx,azy,azz,n)
complex axx,axy,axz,ayx,ayy,ayz,azx,azy,**azz;
int n;
{
 *axx = (complex *)malloc(n*n*sizeof(complex));
 *axy = (complex *)malloc(n*n*sizeof(complex));
 *axz = (complex *)malloc(n*n*sizeof(complex));
 *ayx = (complex *)malloc(n*n*sizeof(complex));
 *ayy = (complex *)malloc(n*n*sizeof(complex));
 *ayz = (complex *)malloc(n*n*sizeof(complex));
 *azx = (complex *)malloc(n*n*sizeof(complex));
 *azy = (complex *)malloc(n*n*sizeof(complex));
 *azz = (complex *)malloc(n*n*sizeof(complex));
} build_blocks(axx,axy,axz,ayx,ayy,ayz,azx,azy,azz,norm,del,n)
complex *axx,*axy,*axz,*ayx,*ayy,*ayz,*azx,*azy,*azz;
THREEVEC *norm;
CMPLXTHREEVEC *del;
int n;
{
 int i,j;
 for(i=0;i<n;i++)
        for(j=0;j<n;j++){
                if (N(j)->z != 0.0){
                        (axx+i*n+j)->re = (N(i)->y*(DEL(i,j)->re).y+N(i)->z*DEL(i,j)->re.z)
                        (axx+i*n+j)->im = (N(i)->y*DEL(i,j)->im.y+N(i)->z*DEL(i,j)->im.z)/N
                        (axy+i*n+j)->re = -N(i)->x*DEL(i,j)->re.x/N(j)->z;
                        (axy+i*n+j)->im = -N(i)->x*DEL(i,j)->im.x/N(j)->z;
                        (axz+i*n+j)->re = -N(i)->z*DEL(i,j)->re.y/N(j)->z;
                        (axz+i*n+j)->im = -N(i)->z*DEL(i,j)->im.y/N(j)->z;
                        (ayx+i*n+j)->re = -N(i)->x*DEL(i,j)->re.y/N(j)->z;
                        (ayx+i*n+j)->im = -N(i)->x*DEL(i,j)->im.y/N(j)->z;
                        (ayy+i*n+j)->re = (N(i)->z*DEL(i,j)->re.z+N(i)->x*DEL(i,j)->re.x)/N
                        (ayy+i*n+j)->im = (N(i)->z*DEL(i,j)->im.z+N(i)->x*DEL(i,j)->im.x)/N
                        (ayz+i*n+j)->re = -N(i)->z*DEL(i,j)->re.y/N(j)->z;
                        (ayz+i*n+j)->im = -N(i)->z*DEL(i,j)->im.y/N(j)->z;
                        (azx+i*n+j)->re = -N(i)->x*DEL(i,j)->re.z/N(j)->z;
                        (azx+i*n+j)->im = -N(i)->x*DEL(i,j)->im.z/N(j)->z;
                        (azy+i*n+j)->re = -N(i)->y*DEL(i,j)->re.z/N(j)->z;
                        (azy+i*n+j)->im = -N(i)->y*DEL(i,j)->im.z/N(j)->z;
                        (azz+i*n+j)->re = (N(i)->x*DEL(i,j)->re.x+N(i)->y*DEL(i,j)->re.y)/N
                        (azz+i*n+j)->im = (N(i)->x*DEL(i,j)->im.x+N(i)->y*DEL(i,j)->im.y)/N
                        }
                }
} assemble_blocks(a,axx,axy,axz,ayx,ayy,ayz,azx,azy,azz,n)
complex *a,*axx,*axy,*axz,*ayx,*ayy,*ayz,*azx,*azy,*azz;
int n;
{
 int i,j;
 for(i=0;i<n;i++)
        for(j=0;j<n;j++){
                        A(i,j)->re = (axx+i*n+j)->re;
                        A(i,j)->im = (axx+i*n+j)->im;
                        A(i,j+n)->re = (axy+i*n+j)->re;
                        A(i,j+n)->im = (axy+i*n+j)->im;
                        A(i,j+2*n)->re = (axz+i*n+j)->re;
                        A(i,j+2*n)->im = (axz+i*n+j)->im;
                        A(i+n,j)->re = (ayx+i*n+j)->re;
                        A(i+n,j)->im = (ayx+i*n+j)->im;
                        A(i+n,j+n)->re = (ayy+i*n+j)->re;
                        A(i+n,j+n)->im = (ayy+i*n+j)->im;
                        A(i+n,j+2*n)->re = (ayz+i*n+j)->re;
                        A(i+n,j+2*n)->im = (ayz+i*n+j)->im;
                        A(i+2*n,j)->re = (azx+i*n+j)->re;
                        A(i+2*n,j)->im = (azx+i*n+j)->im;
                        A(i+2*n,j+n)->re = (azy+i*n+j)->re;
                        A(i+2*n,j+n)->im = (azy+i*n+j)->im;
                        A(i+2*n,j+2*n)->re = (azz+i*n+j)->re;
                        A(i+2*n,j+2*n)->im = (azz+i*n+j)->im;
                        }
```

```
}
free_blocks(axx,axy,axz,ayx,ayy,ayz,azx,azy,azz)
complex **axx,**axy,**axz,**ayx,**ayy,**ayz,**azx,**azy,**azz;
{
 free(*axx);
 free(*axy);
 free(*axz);
 free(*ayx);
 free(*ayy);
 free(*ayz);
 free(*azx);
 free(*azy);
 free(*azz);
}
/*
 * A program to compute the gradient of the free space vector Green's
 * Function.  ri represents the observation point, and rj the source point, or
 * variable of integration.
 */ gradient_phi(p,del,n,k)

THREEVEC *p; /* n long array of surface points */
CMPLXTHREEVEC *del; /* n by n array of complex, three component elements */
int n;
double k; /* wavenumber */
{
 int i,j;
 double dx,dy,dz,d;
 complex temp1,temp2,temp3;
 for(i=0;i<n;i++)
        for(j=0;j<n;j++){
                if(i != j){
                        dx = P(i)->x - P(j)->x;
                        dy = P(i)->y - P(j)->y;
                        dz = P(i)->z - P(j)->z;
                        d = sqrt(dx*dx + dy*dy + dz*dz);
                        temp1.re = 1.0/(d*d*d);
                        temp1.im = k*1.0/(d*d);
                        temp2.re = 0.0;
                        temp2.im = -k*d;
                        cexp(&temp2,&temp3); /* temp3 = exp(-jkd) */
                        cmult(&temp3,&temp1,&temp2); /* temp2 = temp1*temp3 */
                        DEL(i,j)->re.x = dx*temp2.re;
                        DEL(i,j)->im.x = dx*temp2.im;
                        DEL(i,j)->re.y = dy*temp2.re;
                        DEL(i,j)->im.y = dy*temp2.im;
                        DEL(i,j)->re.z = dz*temp2.re;
                        DEL(i,j)->im.z = dz*temp2.im;
                        }
                else {
                        DEL(i,j)->re.x = 0.0;
                        DEL(i,j)->im.x = 0.0;
                        DEL(i,j)->re.y = 0.0;
                        DEL(i,j)->im.y = 0.0;
                        DEL(i,j)->re.z = 0.0;
                        DEL(i,j)->im.z = 0.0;
                        }
                }
} build_a_array(ax,ay,p,norm,k,d,n)
complex *ax,*ay;
THREEVEC *p,*norm;
double k,d;
int n;
{
 complex temp0,temp1,temp2,temp3,temp4;
 int i;
/*
 * Perform numerical integration
 */
temp3.re = 0.0; temp3.im = 0.0;
temp4.re = 0.0; temp4.im = 0.0;
/* initialize a arrays */
for(i=0;i<3*n;i++){
  AX(i)->re = 0.0;
  AX(i)->im = 0.0;
  AY(i)->re = 0.0;
  AY(i)->im = 0.0;
}
for(i=0;i<n;i++){
        temp0.re = cos(k*P(i)->z);
        temp0.im = -sin(k*P(i)->z);
        temp3.re = temp0.re/N(i)->z;
        temp3.im = temp0.im/N(i)->z;
        temp4.re = temp0.re/N(i)->z;
        temp4.im = temp0.im/N(i)->z;
        temp0.re = 0.0;
        temp0.im = k/(4.0*PI*d);
        temp1.re = cos(-k*d);
        temp1.im = sin(-k*d);
```

```
            cmult(&temp0,&temp1,&temp2);
            cmult(&temp3,&temp2,AX(i));
            cmult(&temp4,&temp2,AY(i+n));
        }
}

/*
 * A program to solve for the surface currents given a complex kernel matrix
 * (I-a) = a1+ja2, and an h vector h=h1+jh2. We wish to solve the equation
 *                      (I-a)'l=h, where x = x1+jx2.
 * All dimensions are 3*n.
 */ solve_for_l(a,h,l,n)
complex *a,*h,*l;
int n;
{
complex *a1,*z;
int *ipvt;
double rcond; /* work space for linpack */
int i,j;
int lda,nn,job; /* constants for linpack */
/*
 * Allocate space for the temporary arrays
 */
a1 = (complex *)malloc(3*n*3*n*sizeof(complex));
z = (complex *)malloc(3*n*sizeof(complex));
ipvt = (int *)malloc(3*n*sizeof(int));
/* compute and transpose a1 matrix a1 = (I-A)transpose */
for(i=0;i<3*n;i++)
        for(j=0;j<3*n;j++){
                if (i!=j)
                        A1(i,j)->re = -A(j,i)->re;
                else
                        A1(i,j)->re = 1.0 - A(j,i)->re;
                A1(i,j)->im = A(j,i)->im;
        }
/* Fill x array */
for(i=0;i<3*n;i++){
        L(i)->re = H(i)->re;
        L(i)->im = H(i)->im;

}
lda = 3*n;
nn = 3*n;
/* perform LU decomposition and condition estimation */
zgeco_(a1,&lda,&nn,ipvt,&rcond,z);
if(rcond + 1.0 == 1.0){
        printf(" a is illconditioned, rcond = %g\n%",rcond);
        return;
        }
job = 0;
/* solve complex system of equations */
zgesl_(a1,&lda,&nn,ipvt,l,&job);
/* free space */
free(a1);
free(z);
free(ipvt);
}
```

We claim:

1. A method for determining the shape of a remote surface by sensor fusion using incomplete data from a plurality of sensors, comprising the steps of
   (a) obtaining from a first sensor a first electronic signal representative of the surface,
   (b) constructing a first electronic model of the surface using the first electronic signal,
   (c) using first electronic model as a guide, constructing for a second sensor a predicted electronic signal also representative of the surface,
   (d) obtaining from the second sensor an actual electronic signal representative of the surface,
   (e) minimizing the difference between the predicted electronic signal and the actual electronic signal,
   (f) constructing an additional electronic model of the surface using the result of step (e) as a guide,
   (g) using the additional electronic model of the surface in constructing an additional predicted electronic signal for the second sensor,
   (h) obtaining from the second sensor an additional actual electronic signal representative of the surface,
   (i) minimizing the difference between the additional predicted electronic signal and the additional actual electronic signal, (j) repeating steps (f) through (i) until the difference between the final predicted electronic signal and the actual electronic signal is below a predetermined threshold level whereby, the shape of the remote surface, represented by the final predicted electronic signal, is determined more accurately than can be done with either the first or second sensor alone, and (k) displaying the shape of the remote surface.

2. The method of claim 1, wherein the first sensor is an optical device and the second sensor is a radar device.

3. The method of claim 2, wherein the optical device is a camera and the radar device is a microwave radar.

4. The method of claim 1 wherein a model is constructed using image shaping techniques, the theoretical cross-sections are generated using moment-methods techniques, and the difference between the theoretical and actual cross-sections are minimized by use of the "lmdif()" program from the MINPACK group of programs published by Argonne National Laboratories.

5. The method of claim 4 wherein the moment-method technique is the Numerical Electromagnetic Code published by Ohio State University.

6. The method of claim 5 wherein the image shaping technique is a shape-from-shading technique.

7. The method of claim 5 wherein the image shaping technique is a photometric stereo technique.

8. The method of claim 5 wherein the image shaping technique is a stereopsis technique.

9. The method of characterizing the incompletely observable surface shape of a physical object comprising the steps of (a) obtaining an initial optical image of the object, (b) extracting from the initial optical image of the object occluding contours by thresholding the initial optical image, (c) deriving from the initial optical image a partial shape description for the object by shape-from-shading techniques, (d) computing a set of predicted values for RCS from digital representation of initial optical image using method of moments, (e) obtaining a set of polarized radar scattering cross-sections from the object, (f) minimizing the difference between the set of polarized radar scattering cross-sections and the set of predicted values for RCS, by linear least squares technique, to achieve a refined surface description, (g) repeating steps (d) through (f), using each successively refined surface description in lieu of the initial surface description, until the difference obtained in step (f) is below a predetermined threshold level whereby, the shape of the physical object surface, represented by the refined surface description, is determined more accurately than either the optical image or radar scattering cross sections alone.

10. A method of constructing a representation of the surface of a physical object by sensor fusion of an incomplete optical image of the surface and radar scattering cross-sections of the object comprising the steps of (a) obtaining an optical image of the object (b) obtaining an approximate shape of the object from the optical image, (c) enhancing the edges of the optical image of the object, (d) thresholding the edge-enhanced optical image, (e) extracting the visible portions of the edges of the object from the thresholded optical image, (f) generating a surface shape model of the object from the visible portions of the object, (g) generating theoretical radar cross-sections of the object from the model of the object, (h) obtaining actual radar cross-sections of the object, (i) minimizing the difference between the theoretical cross-sections and the observed cross-sections, by refining the surface shape model of the object whereby, the shape of the physical object surface, represented by the surface shape model, is determined more accurately than either the optical image or radar scattering cross sections alone.

11. The method of claim 10 wherein the approximate shape of the object is obtained by stereopsis techniques, the model of the object is obtained by use of a Geometrical Theory of Diffraction scattering technique, and minimizing the difference between theoretical and actual cross-sections is by use of the "lmdif()" program from the MINPACK group of programs published by Argonne National Laboratories.

12. Apparatus for determining the shape of a space object by fusing the optical and microwave signals from the object comprising (a) optical sensing means for producing an electrical signal representative of the object, (b) low-level image processing means for enhancing the electrical signal, (c) high-level image processing means for extracting shape information from the electrical signal and for producing a first, incomplete surface model representative of the shape of the object, (d) initializing means for receiving the surface model and for filling in incomplete portions of the surface model, (e) microwave receiving means for receiving microwave signals from the object, (f) microwave processing means for producing observed radar scattering cross sections of the object from the microwave signals, (g) computing means for producing theoretical approximations of the radar scattering cross sections of the object using the surface model produced by the initializing means, and for generating a refined surface model by comparing the observed radar scattering cross sections with the theoretical radar scattering cross sections and modifying the surface model to minimize the difference between the theoretical radar scattering cross sections and the observed radar scattering cross sections whereby, the refined surface model thus produced is a more accurate representation of the shape of the space object than either the optical signal or the microwave signal, and (h) display means for displaying the shape of the object.

13. The apparatus of claim 12 wherein a final, complete surface model is produced by successively and iteratively refining the surface model, producing theoretical radar scattering cross sections based on the refined surface model, comparing the theoretical radar scattering cross sections with the observed radar scattering cross sections, and modifying the surface model to minimize the difference between the theoretical and observed radar scattering cross sections.

14. The apparatus of claim 12 wherein the optical sensing means comprises a plurality of optical devices and the low-level processing means comprises stereo imaging techniques and wherein the low-level processing means further comprises analog to digital conversion of the signal and filtering means for deblurring, histogram equalization, and edge enhancement.

15. The apparatus of claim 12 wherein the initialization means for filling in the incomplete surface model employs computation by B-splines surface functions.

16. The apparatus of claim 12 wherein the theoretical radar scattering cross sections are produced by the Numerical Electromagnetic Code are available from Ohio State University and wherein the refined surface model is produced by use of the MINPACK program lmdif() published by Argonne National Laboratory.

17. Apparatus for characterizing the shape of a space object by fusing optical and microwave data from the object, comprising optical image sensor means for producing video signals representative of the object, low level image processor means for performing enhancement of the video signal, said enhancement comprising collecting the video signals, converting them to digital form, and for performing image filtering operations on the digital signals, high level image processor means for extracting shape information from the enhanced video signal to produce an incomplete first surface shape model of the object, radar means for measuring actual radar scattering cross sections of the object, computing means for generating theoretically predicted radar scattering cross sections of the object from the first surface shape model, for minimizing the difference between the theoretically predicted radar scattering cross sections and the actual radar scattering cross sections of the object, for refining the surface model as a result of the minimum difference, and for generating a final surface shape model by successive iterations of minimizing the difference and refining the surface model whereby, the final surface model more accurately characterizes and represents the shape of the space object than either the optical video signals or the radar scattering cross sections, and output means for outputting the shape characterization.

18. Apparatus of claim 18 wherein the theoretically predicted radar scattering cross sections of the object are generated by use of the Numerical Electromagnetic Code available from Ohio State University.

19. Apparatus of claim 17 wherein minimizing the difference between the theoretically predicted radar scattering cross sections and the actual radar scattering cross sections of the object is accomplished by use of the MINPACK program lmdif() published by the Argonne National Laboratory.

20. A method for converting electronic signals representative of the incomplete shape of a remote object to electronic signals representative of a more complete shape of (a) obtaining from a first sensor a first electronic signal representative of the shape of the object, (b) constructing a first electronic model of the shape using the first electronic signal, (c) using first electronic model as a guide, constructing for a second sensor a predicted electronic signal also representative of the shape, (d) obtaining from the second sensor an actual electronic signal representative of the shape, (e) minimizing the difference between the predicted electronic signal and the actual electronic signal, (f) constructing an additional electronic model of the shape using the result of step (e) as a guide, (g) using the additional electronic model of the shape in constructing an additional predicted electronic signal for the second sensor, (h) obtaining from the second sensor an additional actual electronic signal representative of the shape, (i) minimizing the difference between the additional predicted electronic signal and the additional actual electronic signal, (j) repeating steps (f) through (i) until the difference between the final predicted electronic signal and the actual electronic signal is below a predetermined threshold level whereby, the shape of the remote object, represented by the final predicted electronic signal, is determined more accurately than can be done with either the first or second sensor alone, and (k) displaying the shape of the remote surface.

* * * * *